(12) United States Patent
Apblett (10) Patent No.: US 12,371,754 B2
(45) Date of Patent: *Jul. 29, 2025

(54) PROCESS AND SYSTEM FOR EXTRACTION OF IRON OXIDE FROM ORE

(71) Applicant: Great Western Iron Ore Properties Inc., Las Vegas, NV (US)

(72) Inventor: Allen W. Apblett, Stillwater, OK (US)

(73) Assignee: Great Western Iron Ore Properties Inc., Las Vegas, NV (US)

( * ) Notice: Subject to any disclaimer, the term of this patent is extended or adjusted under 35 U.S.C. 154(b) by 1088 days.

This patent is subject to a terminal disclaimer.

(21) Appl. No.: 17/094,762

(22) Filed: Nov. 10, 2020

(65) Prior Publication Data

US 2021/0310089 A1 Oct. 7, 2021

Related U.S. Application Data

(62) Division of application No. 15/862,620, filed on Jan. 4, 2018, now Pat. No. 10,858,713.

(60) Provisional application No. 62/442,276, filed on Jan. 4, 2017.

(51) Int. Cl.
| | |
|---|---|
| *C21B 13/00* | (2006.01) |
| *C01F 7/02* | (2022.01) |
| *C21B 15/00* | (2006.01) |
| *C22B 23/00* | (2006.01) |

(52) U.S. Cl.
CPC .............. *C21B 13/006* (2013.01); *C01F 7/02* (2013.01); *C21B 15/00* (2013.01); *C22B 23/005* (2013.01); *C21B 2300/02* (2013.01)

(58) Field of Classification Search
CPC ... C21B 13/006; C21B 15/00; C21B 2300/02; C01F 7/02; C22B 23/005
USPC .......................................................... 423/83
See application file for complete search history.

(56) References Cited

U.S. PATENT DOCUMENTS

| | | |
|---|---|---|
| 3,979,205 A | 9/1976 | Wanzenberg |
| 4,405,588 A | 9/1983 | Caballero et al. |
| 7,101,524 B2 | 9/2006 | Small |
| 9,068,247 B2 | 6/2015 | Marston et al. |
| 10,858,713 B1 | 12/2020 | Apblett |
| 2009/0105493 A1 | 4/2009 | Jang et al. |
| 2018/0036743 A1 | 2/2018 | Wilson et al. |

OTHER PUBLICATIONS

Roberto Torres, Miguel A. Blesa, and Egon Matijevic "Interactions of Metal Hydrous Oxides with Chelating Agents" journal of Colloid and Interface Science, vol. 131, No. 2, Sep. 1989.

*Primary Examiner* — Coris Fung
(74) *Attorney, Agent, or Firm* — Clayton Howarth, P.C.

(57) ABSTRACT

A method and system of extracting iron oxide from ore is provided, which may include adding a chelating agent to an iron ore to form an iron ore and chelating agent solution, heating the solution to reflux in water, and filtering the solution to yield an extraction residue and a chelated iron solution. The chelated iron solution may be treated with a potassium hydroxide and water solution to yield iron hydroxide.

16 Claims, 4 Drawing Sheets

PROCESS AND SYSTEM FOR EXTRACTION OF IRON OXIDE FROM ORE

CROSS-REFERENCE TO RELATED APPLICATIONS

This application is a divisional application of prior pending U.S. patent application Ser. No. 15/862,620, filed Jan. 4, 2018, which claims the benefit of U.S. Provisional Patent Application No. 62/442,276, filed Jan. 4, 2017, entitled "PROCESS FOR EXTRACTION OF IRON OXIDE FROM ORE" which are hereby incorporated by reference in their entirety, including, but not limited to, those portions that specifically appear hereinafter, this incorporation by reference being made with the following exception: In the event that any portion of the above referenced applications are inconsistent with this application, this application supercedes said above referenced applications.

STATEMENT REGARDING FEDERALLY SPONSORED RESEARCH OR DEVELOPMENT

Not Applicable.

BACKGROUND

1. The Field of the Present Disclosure

This disclosure is particularly directed towards a process for extraction of iron oxide. Specifically, this invention is directed towards an improved process for extracting high yields of iron oxide and/or chelated iron from iron ore.

2. Description of the Related Art

Iron ores are commonly mined to be processed for a variety of purposes. For example, iron ores contain iron oxides and may be processed for the extraction of metallic iron. Metallic iron may be used in the production of important metals, such as steel.

Traditionally, iron ores having high concentrations of iron can be directly used in the smelting of iron. For ores of lower concentration of iron, or to obtain a more purified iron oxide or iron chemicals, the iron ore must undergo a process for extraction of the oxide. For example, ore may be crushed to fine pieces and concentrated by way of a gravity separation process, which may also involve the removal of clays, sand, and other soil components by washing with water. The concentrated ore may then undergo a process of calcination, where the ore is heated in the absence of air, before being smelted in a blast furnace to produce iron. However, such known practices may lead to inefficient recovery of iron oxide, as some concentration of iron may be lost in the processing.

Thus, there continues to be a need for an improved method and process for efficiently and economically extracting high quality, purified iron oxide or iron-containing chemicals from ore.

BRIEF SUMMARY

Method and system for extracting iron products from iron ore are described herein. In one embodiment, the method includes providing an iron ore, adding a chelating agent to form an iron ore and chelating agent solution, heating the iron ore and chelating agent solution to reflux in water to yield a reacted iron ore and chelating agent solution, filtering the reacted iron ore and chelating agent solution to yield an extraction residue and a chelated iron solution, and treating the chelated iron solution with a potassium hydroxide and water solution to yield iron hydroxide.

These and other objects and features of the present invention will become more fully apparent from the following description and appended claims, or may be learned by the practice of the invention as set forth hereinafter.

BRIEF DESCRIPTION OF THE DRAWINGS

Reference will now be made to the accompanying drawings, wherein.

DETAILED DESCRIPTION

For the purposes of promoting an understanding of the principles in accordance with the disclosure, reference will now be made to the embodiments described herein and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present process is disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present disclosure will be limited only by the appended claims and equivalents thereof.

It must be noted that, as used in this specification and the appended claims, the singular forms "a," "an," and "the" include plural referents unless the context clearly dictates otherwise.

In describing and claiming the present disclosure, the following terminology will be used in accordance with the definitions set out below.

As used herein, the terms "comprising," "including," "containing," "characterized by," and grammatical equivalents thereof are inclusive or open-ended terms that do not exclude additional, un-recited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

The terms "weight percent," "percent by weight," and "% by weight" all refer to the concentration of a component substance as the weight of the component substance divided by the weight of the composition multiplied by 100. The weight percentages referred to herein shall be considered to include the ranges 1-2, 2-3, 1-3 and all the values within. Thus, if the weight percentage is 10, this may include the values 7 and 13 and all the values between those. All such terms are intended to be defined as meaning the values which are about, or close, to the recited value are intended to be within scope of the recited value.

This disclosure describes a process or method and system of extracting iron oxide from ore with the capability of producing purified iron oxide with a very high recovery rate of iron, leaving very little iron in the byproducts of the process. The method may include adding a chelating agent to an iron ore to form an iron ore and chelating agent solution, heating the solution to reflux in water, and filtering the solution to yield an extraction residue and a chelated iron solution. The chelated iron solution may be treated with a potassium hydroxide and water solution to yield iron hydroxide after centrifugation.

Additionally, the extraction residue may be treated with ammonium hydroxide and washed. The washings may be combined with the supernatant from the centrifugation, for example the tetrapotassium EDTA that remains after the iron hydroxide is filtered by centrifugation, and the solution may be acidified to precipitate the chelating agent in high yield for reuse in the extraction process.

A system of extracting iron oxide from ore is also described herein. The system may include a reactor configured to heat iron ore, a chelating agent and water to reflux to produce an iron ore and chelating agent solution, a filtering device configured to filter the iron ore and chelating agent solution into an extraction residue and a chelated iron solution, and a treatment container for treating the chelated iron solution with a potassium hydroxide and water solution to yield iron hydroxide.

The advantages and benefits of the present process will be apparent to those of skill in the art, as more fully disclosed below. In particular, this process and system for extraction of iron oxide from ore may be more efficient than traditional methods of extraction, resulting in a higher recovery of iron oxide, while also yielding valuable byproducts that may be sold or otherwise reused. In addition, the presently disclosed process and system may be more cost effective than traditional methods of extraction, requiring less heat and yielding a higher quality product.

In some embodiments, the method may include providing an iron ore, adding a chelating agent to the iron ore to form an iron ore and chelating agent solution, heating the iron ore and chelating agent solution to reflux in water to yield a reacted iron ore and chelating agent solution, filtering the reacted iron ore and chelating agent solution to yield an extraction residue and a chelated iron solution, and treating the chelated iron solution with a potassium hydroxide and water solution to yield iron oxide.

The iron oxide may be an iron oxide precipitate. The iron oxide may be in the form of a powder, a pigment, a film, or a coating. The iron oxide may be in multiple forms. The iron oxide may be in the form of nanoparticles, or bulk material. The size of the iron oxide may be varied and controlled by varying conditions. For example, some embodiments may control the particle size of the iron oxide by varying the conditions for the step of treating the chelated iron solution with a potassium hydroxide and water solution to produce varying particle size iron oxides. Concentrated solutions may produce bulk material iron oxides and dilute solutions may produce nanoparticle iron oxide.

In some embodiments, the step of heating the iron ore and chelating agent solution to reflux in water to yield a reacted iron ore and chelating agent solution may be performed in a reactor. In some embodiments, that reactor may be pressurized. Other reactors that allow for the heating of a reaction may also be used as known to those of ordinary skill in the art.

In some embodiments, the step of treating the chelated iron solution with a potassium hydroxide and water solution yields an iron hydroxide precipitate may further comprise the step of separating the iron hydroxide precipitate from a supernatant by centrifugation to yield an iron hydroxide. Some embodiments may further comprise the steps of treating the extraction residue with ammonium hydroxide, washing and drying the extraction residue and ammonium hydroxide to yield a washings solution and a dry extraction residue, combining the washings solution with the supernatant, and acidifying the washings solution and supernatant to yield the chelating agent and an aqueous potassium sulfate. The chelating agent produced by the acidification of the washings solution and supernatant may be added to the iron ore and chelating agent solution, thus recycling the chelating agent.

In some embodiments, only some of the chelating agent is recycled. In some embodiments, none of the chelating agent is recycled. Recycling the chelating agent may be beneficial economically for some processes embodied in this description. In some embodiments, which will be discussed below, the chelating agent may not be recovered.

Some methods include heating the iron hydroxide to yield iron oxides and pigments. In some embodiments, the method includes producing a magnetite by dehydration and partial reduction of the iron hydroxide. Some embodiments include the method step of producing iron metal by heating the iron hydroxide with a carbon.

As is one of the benefits of the present process, iron ore may be one or more of several sources. Iron ore may include raw material in the form of hematite, magnetite, limonite, siderite, bog-iron ore, clay minerals, ores with concentrations of less than about 30% iron by weight, scrap metals, magnets, slag, fly ash, red mud, and other materials that have iron as is known by those of ordinary skill in the art. Iron ore may include one or more of the raw materials listed here, or another material as known to those of ordinary skill in the art. It is acknowledged that a benefit of the present disclosure is the economic viability of iron oxide extraction from iron ores with iron concentrations lower than what is economically viable with conventional methods. It is appreciated that iron ores with mid range (about 30 to about 60% iron by weight) and high range (above about 60% iron by weight) iron deposits are also preferred for embodiments of this invention.

In some embodiments, a catalyst may be added to the step of heating the iron ore and chelating agent solution to reflux in water to yield a reacted iron ore and chelating agent solution. In some embodiments, the catalyst may be a portion of the reacted iron ore and chelating agent solution.

In some embodiments, the reaction of chelating agent and iron ore may be self-catalyzing. In some embodiments the catalyst may be a soluble salt of ethylenediaminetraacetic acid (EDTA).

Examples of a method and system of extracting iron oxide from ore will now be described in detail, with reference to the drawings. It is to be understood that the following are merely examples of the process disclosed herein, as various alternatives will be discussed at each step of the process. While the steps of the process will be grouped and discussed together for ease of understanding, the various potential embodiments of the presently disclosed process will be understood to those of ordinary skill in the art.

Figure 1:
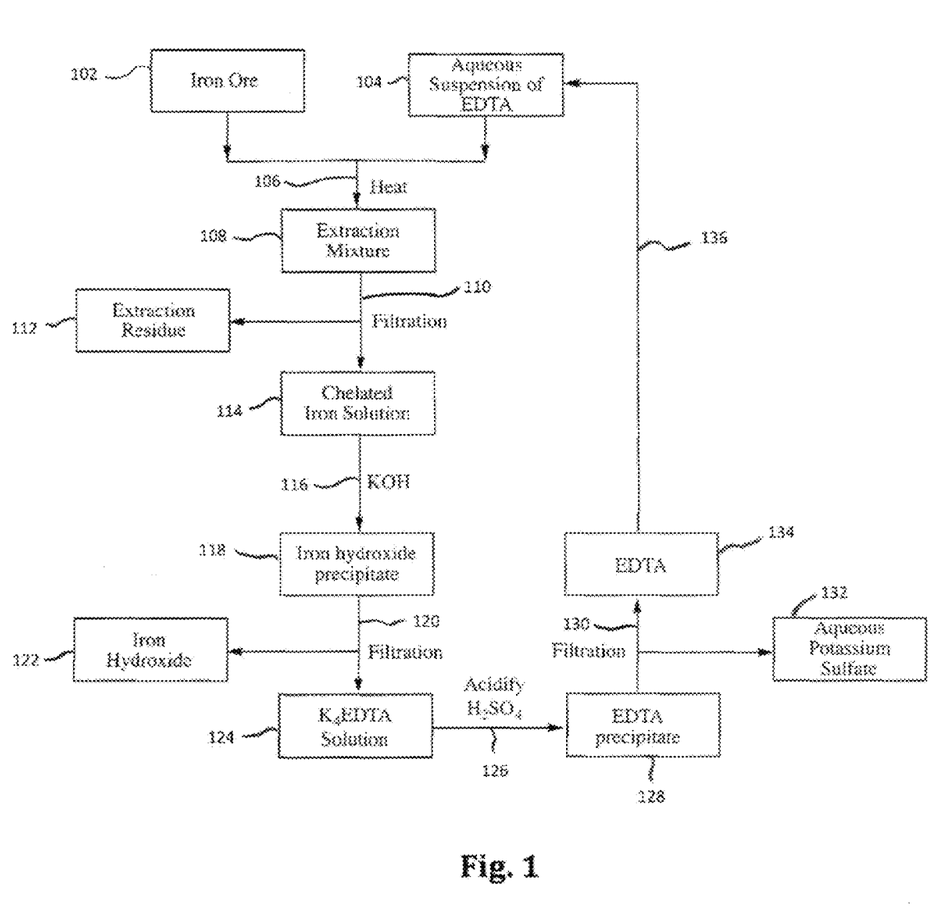
FIG. 1 is a chart showing a process for extraction of iron oxide from ore in accordance with the present disclosure.

A method 100 of extracting iron oxide from ore is represented in FIG. 1. The method 100 may include providing an iron ore 102 and adding a chelating agent 104 to the iron ore 102 to form an iron ore and chelating agent solution. The chelating agent, or extraction agent, may be a ligand such as an aminopolycarboxylic acid. For example, the chelating agent may be chosen from one of ethylenediaminetetraacetic acid (EDTA) and diethylenetriaminepentaacetic acid (DTPA). In another embodiment, the chelating agent may be ethylenadiaminediaminedi-o-hydroxyphenylacetic acid (EDDHA). The chelating agent may be suspended in water. In particular, an aqueous suspension of EDTA may be a useful chelating agent or extraction agent.

The method 100 may include step 106 of heating the iron ore and chelating agent solution to reflux in water to yield a reacted iron ore and chelating agent solution, or extraction mixture 108. Heating the iron ore and chelating agent solution to reflux, or under reflux, such as in a flask which is attached to a condenser, such as a vertical, open Liebig condenser (or one of its variants), allows the evaporated mixture to be returned to the reaction mixture, preventing the loss of components of the mixture, while supplying continued energy to the reaction. This allows the reaction to take place over a long period of time. For example, a slow reaction may first take place, which may result in a small amount of iron dissolving from the ore and chelating agent solution. After a sufficient amount of iron has dissolved, a rapid reaction may occur, yielding a reacted iron ore and chelating agent solution. Accordingly, the reaction may be self-catalytic.

Step 110 of method 100 may include filtering the reacted iron ore and chelating agent solution to yield an extraction residue 112 and a chelated iron solution 114. Prior to the filtering, the reacted iron ore and chelating agent solution may be cooled. The solution may be filtered at step 110 by any means known to those of ordinary skill in the art. For example, the extraction residue 112 may be filtered from the chelated iron solution by centrifugation, to separate the extraction residue, which may be a pale solid material, from the chelated iron solution. The extraction residue 112 may be treated separately, as discussed in more detail below.

At step 116, the chelated iron solution 114, which may be a filtrate having an orange-brown color, may be treated with a solution of potassium hydroxide in water. Treating the chelated iron solution with a potassium hydroxide and water solution may yield iron hydroxide 122. More specifically, step 116 may yield an iron hydroxide precipitate 118. The method 100 may further comprise the step 120 of filtration or separating the iron hydroxide precipitate 118 from a supernatant by centrifugation to yield an iron hydroxide 122. The resulting supernatant from the centrifugation may be a tetrapotassium EDTA 124, or may be any other solution of the chelating agent and the remaining components of the potassium hydroxide and water solution of step 116.

Returning attention to the extraction residue 112 resulting from the filtration of the extraction mixture 108 at step 110 of method 100, the extraction residue 112 may be treated with ammonium hydroxide in order to remove excess chelating agent that may remain. The extraction residue and ammonium hydroxide may be washed and dried to yield a washings solution and a dry extraction residue. The washing solution may then be used in the efforts to recover as much of the chelating agent as possible, as discussed below.

Specifically, at step 126 of method 100, the washings solution may be combined with the supernatant from the filtration 120 of the iron hydroxide precipitate 118. Step 126 may further include acidifying the washings solution and supernatant to yield the chelating agent precipitate, such as EDTA precipitate 128. Acidification may employ sulfuric acid, which precipitates the chelating agent, such as EDTA, since such agents are fairly insoluble in water. Alternatively, the acidification of step 126 may employ any other acidifying agent, as known to those of ordinary skill in the art.

The chelating agent precipitate, see step 128, from the acidification of step 126 may be filtered at step 130 to yield a chelating agent 134, such as EDTA, and an aqueous potassium sulfate 132. Finally, at step 136, the high yield of recovered chelating agent may be reused in the extraction process of method 100 as the chelating agent, step 104.

It will be appreciated that the general steps of the process for extracting iron oxide from ore disclosed herein may be embodied by various example combinations of chemicals and materials. One embodiment of specific materials and chemicals, including weights and compositions of the materials, will now be discussed, with the understanding that the present disclosure is not limited to only these specific formulations.

Figure 5:
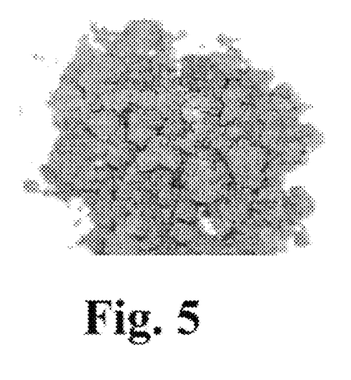
FIG. 5 depicts an iron ore in accordance with an embodiment of the present disclosure.
Figure 8:
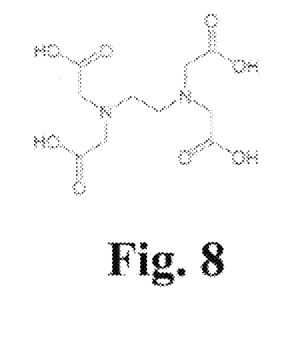
FIG. 8 depicts a chemical formula for an example chelation agent in accordance with an embodiment of the present disclosure.

In an example embodiment of method 100 for extraction of iron oxide from ore, 9.33 grams of EDTA, the chemical formula of which is shown in FIG. 8, is combined with 3.17 grams of iron ore, such as the iron ore depicted in FIG. 5. The iron ore contains 72.3 percent by weight of iron, as indicated from x-ray fluorescence spectroscopy data. The EDTA and iron ore are heated to reflux in 150 milliliters of water. A slow reaction first takes place, for example over a six (6) hour time period, during which a small amount of iron dissolves from the ore. After a sufficient amount of iron is dissolved, a rapid reaction occurs, causing the dark purple-red color of the ore to completely disappear, yielding an orange-brown solution and a pale solid. After a total of about twelve (12) hours, the reacted solution is cooled to prepare for filtration.

Figure 6:
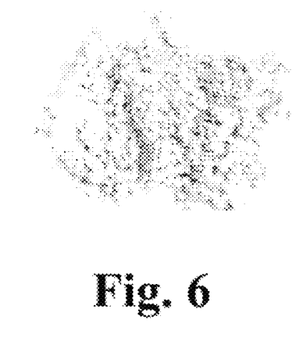
FIG. 6 depicts an extraction residue in accordance with an embodiment of the present disclosure.

The pale solid filtration residue is filtered from the chelated iron solution, which is an orange-brown colored solution. The excess EDTA is removed from the extraction residue by treating it with about 20 milliliters of ammonium hydroxide, then washing and drying the extraction residue. The resulting extraction residue is a peach-colored fine powder of about 0.81 grams, as depicted in FIG. 6.

Figure 7:
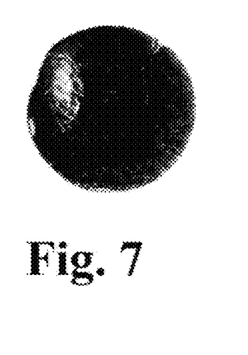
FIG. 7 depicts a purified iron oxide in accordance with an embodiment of the present disclosure.

The orange-brown chelated iron solution is treated with a solution of about 7.7 grams of potassium hydroxide in 20 milliliters of water, causing the iron to slowly precipitate from the chelated iron solution as iron hydroxide precipitate. The iron hydroxide precipitate is separated by centrifugation, washed with water, and dried in a vacuum chamber to produce dark red-black colored pellets of iron oxide, as depicted in FIG. 7. The iron oxide pellets retain their shape and do not break upon calcination to 600 degrees Celsius, likely a useful property for making iron nuggets.

The purified iron oxide weighs about 2.24 grams. Considering the process began with about 3.17 grams of iron ore having about 72.3% by weight of iron oxide (or about 2.29 grams of iron oxide), the example of the process of the present disclosure results in a very beneficial 98% recovery of the iron.

Moreover, about 98% recovery of the iron from the process disclosed herein is most preferred. A range of about 90% to about 98% recovery of iron is preferred. In some embodiments, about 50 to about 90% recovery has application with the present disclosure.

Additionally, the supernatant from the centrifugation step, in this case tetrapotassium, EDTA is combined with the washings from the removal of the excess EDTA from the extraction residue and acidified with sulfuric acid, precipitating about 8.81 grams of EDTA, representing about a 94% recovery of the about 9.33 grams of EDTA used to begin the process, which recovered EDTA can be used as the chelating agent in another extraction.

In an embodiment, the iron chelates 114 resulting from step 110 of method 100, as shown in FIG. 1, may alternatively be used for purposes other than extracting purified iron oxide. In other words, as will be appreciated by those of ordinary skill in the art, step 106 of method 100, including the heating under reflux of iron ore with a chelating agent, and step 110 of filtering out a chelated iron solution, may themselves be a valuable process for creating iron chelates. Such iron chelates commercially used as a fertilizer or may be used for removing or scrubbing hydrogen sulfide and nitrogen oxide from gas streams, as iron supplements for people and animals, and in photography, as well as other applications.

In an embodiment, the potassium sulfate 132 resulting from filtration of step 130 of the EDTA precipitate 128, which potassium sulfate may be known as potash, can be sold and used in fertilizer. Accordingly, the byproducts of method 100 are valuable and useful, resulting in a more efficient process for extracting high yields of iron hydroxide from iron ore.

Figure 2:
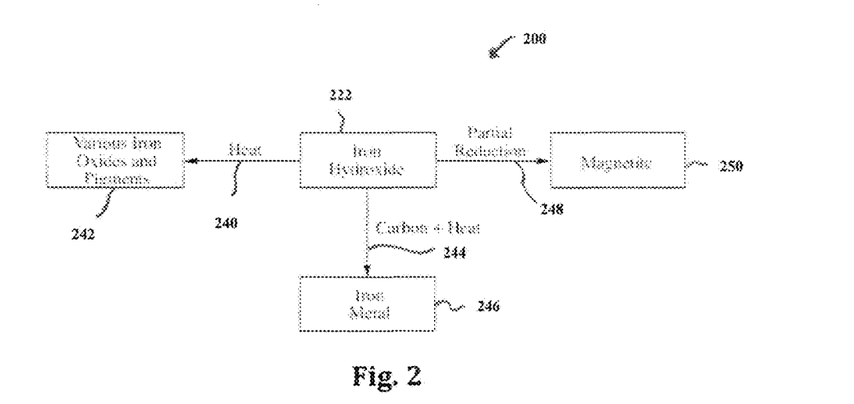
FIG. 2 is a chart showing various operations for processing iron hydroxide according to the present disclosure.

As shown in the chart of FIG. 2, the iron hydroxide 222, which may be the iron hydroxide extracted by way of process 100 of FIG. 1, may be treated in one of a variety of treatments 200. For example, iron hydroxide may be heated in step 240 to yield various iron oxides and pigments 242. The heating of step 240 may include calcination, or heating at a high temperature, but below the melting or fusing point of the iron hydroxide, which may cause loss of moisture, reduction or oxidation, or the decomposition of some of the elements of the compound, thereby yielding the various iron oxides and pigments.

In another example, the iron hydroxide 222 may be treated at step 244 with carbon and heat to yield iron metal 246. In other words, iron metal may be produced by heating the iron hydroxide with a carbon. The heating may be referred to as smelting, and may include the heating of the iron hydroxide 222 in a blast furnace. Carbon may be introduced by way of a coke, or a fuel with high carbon content, such as coal.

In yet another example, the iron hydroxide 222 may undergo partial reduction at step 248 to yield magnetite 250. In other words, the method of the present disclosure may include producing a magnetite, an oxide of iron that is ferrimagnetic and can also be magnetized itself, by dehydration and partial reduction of the iron hydroxide.

Figure 3:
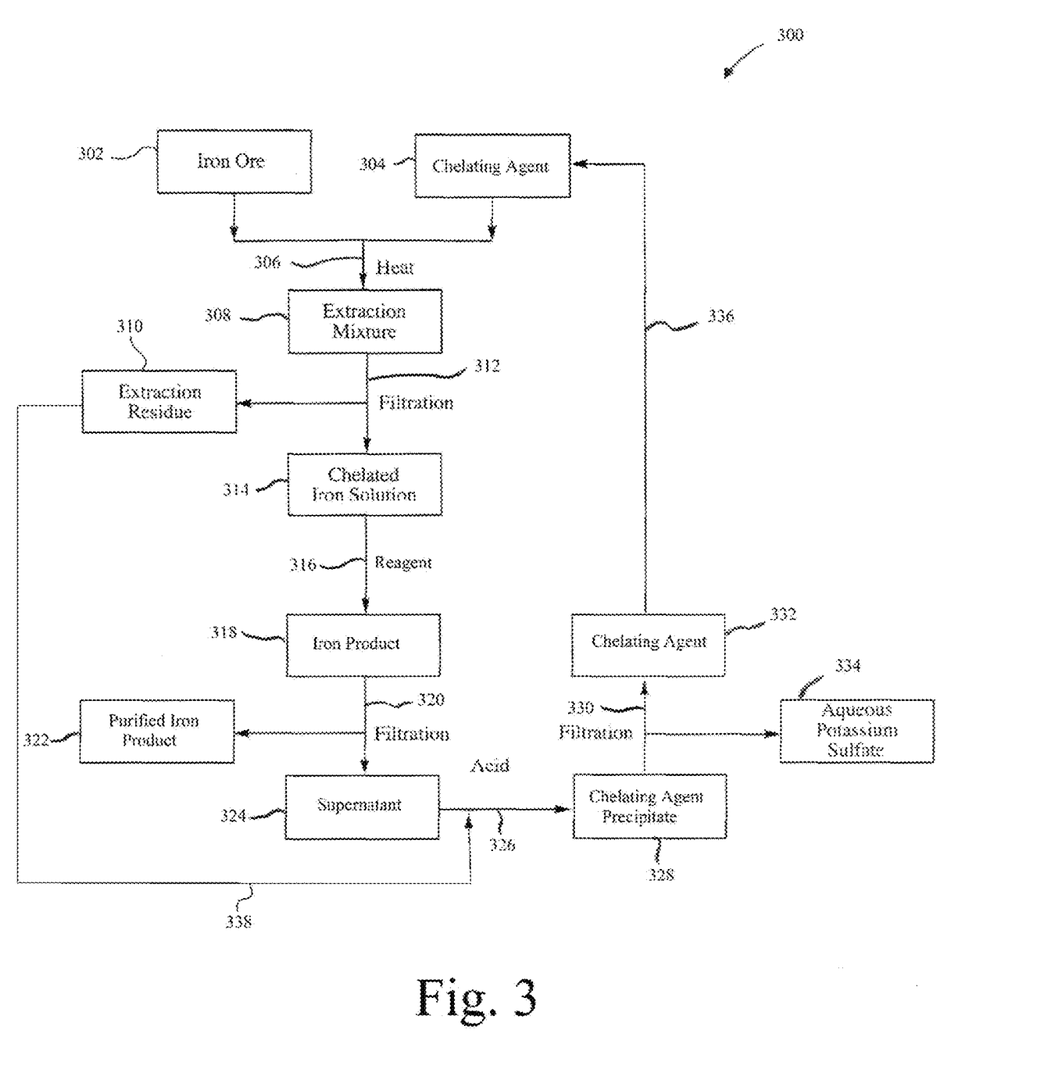
FIG. 3 is a chart showing a process for extraction of iron product from ore in accordance with the present disclosure.

A method 300 of producing iron product is shown in FIG. 3. The method 300 may include providing iron ore 302 and a chelating agent 304 to form an iron ore and chelating agent solution. Step 306 may include heating the iron ore and chelating agent solution to reflux in water in step 306 to yield an extraction mixture 308. In some embodiments, extraction mixture 308 may be a reacted iron ore and chelating agent solution. Step 312 may include filtering the extraction mixture 308 to yield an extraction residue 310 and a chelated iron solution 314.

Step 316 may include treating the chelated iron solution 314 with a reagent to produce an iron product 318. The iron product 318 may be purified in step 320 by filtration, separating it as purified iron product 322 from supernatant 324. The iron product 318, and purified iron product 322, may vary based on the reagent used in step 316. Examples of iron product 318 include magnetite, metallic iron, magnetite nanoparticles, iron oxide, or other iron products as known to those of ordinary skill in the art.

In some examples, the chelated iron solution 314 may further comprise chelated iron ions and other metal ions. In some embodiments, the method further comprises adding other metal ions to the chelated iron solution 314. The addition of other metal ions may produce iron product 318 that comprises a ferrite, a multimetallic oxide, or a metal alloy. In some examples, the step of treating the chelated iron solution 314 with a reagent to produce an iron product 318 further comprises adding chromite ore. The iron product 318 from the addition of chromite ore may be a stainless steel.

In some embodiments, this step may further comprise adding the reagent in a stoichiometric amount, wherein the reagent is a reducing gent and the iron product 318 is magnetite. The reagent used in this step may be sodium borohydride, hydrazine, or a similar compound as known to those of ordinary skill in the art. The reagent may be a mixture of compounds as well.

In some embodiments, step 316 may further comprise adding the reagent in an excess amount relative to the chelated iron solution, wherein the reagent is a reducing agent and the iron product 318 is metallic iron. Step 316 may further comprise adding the reagent in an excess amount relative to the chelated iron solution 314, wherein the reagent is a reducing agent and the iron product 318 is magnetite nanoparticles in some examples.

In some examples, step 316 of treating the chelated iron solution with a reagent to produce an iron product may further comprise spray pyrolyzing the chelated iron solution 314, wherein the reagent is heat, and the iron product 318 is an iron oxide. Iron oxide from this step may have different properties including a pigment, a film or a coating.

In some embodiments, the step 316 of treating the chelated iron solution 314 with a reagent to produce an iron product further comprises metal organic deposition wherein the iron product 318 is an iron oxide.

The iron ore may also comprise at least one raw material from the group consisting essentially of: hematite, magnetite, limonite, siderite, bog-iron ore, clay minerals, ores with iron concentrations of less than about 30% iron by weight, scrap metals, magnets, slag, fly ash, and red mud. Other raw materials containing iron may be used as known to those of ordinary skill in the art.

In some examples, the step 316 of treating the chelated iron solution 314 with a reagent to produce an iron product 318 further comprises treating the chelated iron solution 314 with potassium hydroxide and water solution to produce an iron hydroxide precipitate. The step 320, may further comprise separating the iron hydroxide precipitate from a supernatant 324 by centrifugation to yield an iron hydroxide. In some embodiments, step 320 may comprise separating purified iron product 322 from supernatant 324 by filtration. Filtration may be by centrifugation or by other equivalent means as known in the art.

In step 326, the supernatant 324 may be combined with the extraction residue 310 and acidified to yield chelating agent precipitate 328. In step 330, the chelating agent precipitate may be filtered into aqueous potassium sulfate 334 and chelating agent 332. Chelating agent 332 may be recycled in recycle stream 336 and placed with the original chelating agent 304. In some embodiments, step 326 may comprise treating the extraction residue with ammonium hydroxide, washing and drying the extraction residue and ammonium hydroxide to yield a washings solution and a dry extraction residue, combining the washings solution with the supernatant, and acidifying the washings solution and supernatant to yield the chelating agent and an aqueous potassium sulfate.

In some embodiments, the chelating agent 332 produced by step 330 may all be recycled into step 306. In some embodiments, some or none of the chelating agent produced by step 330 may be recycled into step 306. In some embodiments, the production of iron product precludes the formation of chelating agent.

Figure 4:
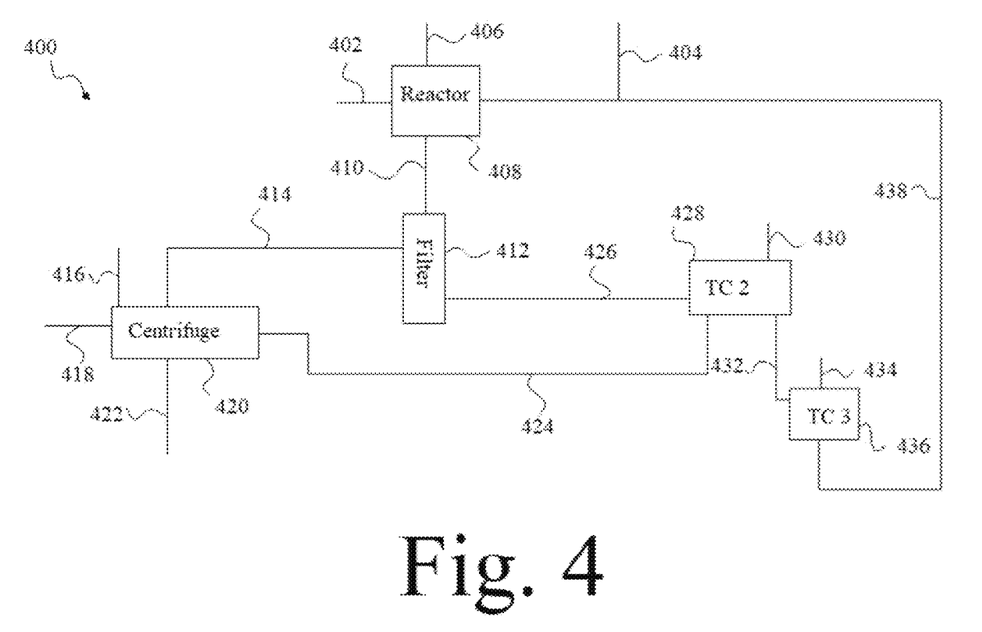
FIG. 4 is a diagram showing a system for extraction of iron product from ore in accordance with the present disclosure.

A system 400 for extracting iron oxide from ore will now be described by reference to FIG. 4. The system 400 may comprise iron ore feed 402, a chelating agent feed 404, and water feed 406 that is provided to a reactor 408. The reactor 408 may be configured to heat the chelating agent, iron ore, and water to reflux to produce and iron ore and chelating agent solution which exits the reactor on reactor exit feed 410. Reactor exit feed 410 may feed into a filtering device 412 configured to filter the iron ore and cheating agent solution into an extraction residue and a chelated iron solution. The extraction residue may exit the filtering device 412 along extraction residue stream 426 and the chelated iron solution may exit the filtering device along chelated iron solution stream 414.

Centrifuge 420 may treat the chelated iron solution stream 414, with the addition of potassium hydroxide along potassium hydroxide feed 416 and water along water stream 418 to yield iron hydroxide, which may exit centrifuge 420 along exit stream 422. Supernatant may also be produced in centrifuge 420, and may be combined with extraction residue stream 426 in treatment center two, "TC 2," 428 by way of supernatant stream 424. Ammonium hydroxide feed 430 may also enter treatment center two 428 to wash the extraction residue and supernatant resulting in a washings solution which exits treatment center two 428 in stream 432 which conveys the washings solution to treatment center three, "TC 3," 436. In treatment center three 436, the washings solution is combined with an acid, which enters treatment center three by way of acid stream 434 to yield the chelating agent and an aqueous potassium sulfate. The chelating agent exits treatment center three 436 by way of recycle stream 438, where it may be combined with chelating agent feed 404.

System 400 is one example of a system taught by this disclosure and not intended to be limiting in the scope of the invention.

In some embodiments, a system of extracting iron oxide from ore may comprise iron ore, a chelating agent, water, a reactor configured to heat the chelating agent, iron ore and water to reflux to produce an iron ore and chelating agent solution, a filtering device configured to filter the iron ore and chelating agent solution into an extraction residue and a chelated iron solution and a treatment container for treating the chelated iron solution with a potassium hydroxide and water solution to yield iron hydroxide. In some embodiments, the treatment container may further comprise a centrifuge configured to separate an iron hydroxide precipitate from a supernatant to yield the iron hydroxide. In some embodiments the treatment container may separate the iron hydroxide by equivalent means as known to those of ordinary skill in the art.

The system may further comprise a second treatment container configured to combine the extraction residue and ammonium hydroxide to yield a washings solution and a dry extraction residue and a third treatment container configured to combine the washings solution with an acid and the supernatant to yield the chelating agent and an aqueous waste stream.

In some examples, the system may further comprise a recycle stream configured to return the chelating agent to the reactor from an exit stream connected to the third treatment container.

The filtering device in the system may be any device capable of filtering the iron ore and chelating agent solution into an extraction residue and a chelated iron solution including, but not limited to a separations column, a vibrating screen, a magnetic separator, an electrostatic separator, an efficient thickener, a grid type ball mill, an autogenous mill, a submerged spiral classifier, a leaching agitation tank, and a mechanical agitation type floatation cell.

In some embodiments, the system may be controlled to produce a set size iron product. In some embodiments, the system may be configured to produce iron nanoparticles. In some embodiments, the system may be configured to produce iron oxide bulk material. In some embodiments, the system may be configured to be able to adjust the size of the iron oxide material produced.

In some embodiments, the reactor is pressurized. Hydrothermal conditions in a pressurized reactor may be utilized to accelerate the extraction of iron, thus making the system more efficient. In some embodiments, a catalyst may be used in the system to enhance the extraction of iron.

In some examples, the system may comprise iron ore that comprises less than 30 percent iron by weight. The system and method described in this disclosure allows for a lower concentration of iron in the iron ore to be economically viable to extract. In some embodiments, the iron ore may comprise between 30 and 60 percent iron by weight. In some embodiments, an iron ore with a high percentage of iron may be used, in an amount greater than about 60 percent iron by weight.

In view of the foregoing, it will be appreciated that the present disclosure provides an improved method and process for extracting high yields of iron oxides from iron ore. In particular, the extraction process disclosed herein more efficiently provides high yields of purified iron hydroxide, while recovering high yields of chelating agents to be reused in the later extraction processes, and producing other valuable byproducts that are commercially valuable.

It will be appreciated that the process of the present disclosure is scalable, and may be adapted to large scales of ongoing processing to result in high-output iron oxide extraction.

It will also be appreciated that the process of the present disclosure may also be utilized to recover other transition metals, lanthanide metals, and aluminum.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of any single foregoing disclosed embodiment. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in quantities, proportions, materials, and manner of making and use may be made without departing from the principles and concepts set forth herein.

What is claimed is:

1. A method of extracting iron product from ore, comprising:
   providing an iron ore;
   adding a chelating agent to the iron ore to form an iron ore and chelating agent solution;
   heating the iron ore and chelating agent solution to reflux in water to yield a reacted iron ore and chelating agent solution;
   filtering the reacted iron ore and chelating agent solution to yield an extraction residue and a chelated iron solution; and,
   treating the chelated iron solution with a reagent to produce an iron product.

2. The method of claim 1, wherein the step of treating the chelated iron solution with a reagent to produce an iron product further comprises adding the reagent in a stoichiometric amount, wherein the reagent is a reducing agent and the iron product is magnetite.

3. The method of claim 2, wherein the reagent is selected from the group consisting essentially of: sodium borohydride and hydrazine.

4. The method of claim 1, wherein the step of treating the chelated iron solution with a reagent to produce an iron product further comprises adding the reagent in an excess amount relative to the chelated iron solution, wherein the reagent is a reducing agent and the iron product is metallic iron.

5. The method of claim 1, wherein the step of treating the chelated iron solution with a reagent to produce an iron product further comprises adding the reagent in an excess amount relative to the chelated iron solution, wherein the reagent is a reducing agent and the iron product is magnetite nanoparticles.

6. The method of claim 1, wherein the step of treating the chelated iron solution with a reagent to produce an iron product further comprises spray pyrolyzing the chelated iron solution, wherein the reagent is heat, and the iron product is an iron oxide.

7. The method of claim 6, wherein the iron oxide has a property selected from the group consisting essentially of: a powder, a pigment, a film and a coating.

8. The method of claim 1, wherein the step of treating the chelated iron solution with a reagent to produce an iron product further comprises metal organic deposition wherein the iron product is an iron oxide.

9. The method of claim 1, wherein the iron ore comprises at least one raw material from the group consisting essentially of: hematite, magnetite, limonite, siderite, bog-iron ore, clay minerals, ores with iron concentrations of less than about 30% iron by weight, scrap metals, magnets, slag, fly ash, and red mud.

10. The method of claim 1, wherein the chelated iron solution further comprises chelated iron ions and other metal ions.

11. The method of claim 10, wherein the iron product comprises a product selected from the group consisting essentially of: a ferrite, a multimetallic oxide, or a metal alloy.

12. The method of claim 1, wherein the method further comprises adding other metal ions to the chelated iron solution.

13. The method of claim 12, wherein the iron product comprises a product selected from the group consisting essentially of: a ferrite, a multimetallic oxide, or a metal alloy.

14. The method of claim 1, wherein the step of treating the chelated iron solution with a reagent to produce an iron product further comprises adding chromite ore and wherein the iron product is a stainless steel.

15. The method of claim 1, wherein the step of treating the chelated iron solution with a reagent to produce an iron product further comprises:
   treating the chelated iron solution with a potassium hydroxide and water solution to produce an iron hydroxide precipitate; and,
   the method further comprising the step of separating the iron hydroxide precipitate from a supernatant by centrifugation to yield an iron hydroxide.

16. The method of claim 15, further comprising:
   treating the extraction residue with ammonium hydroxide;
   washing and drying the extraction residue and ammonium hydroxide to yield a washings solution and a dry extraction residue;
   combining the washings solution with the supernatant; and,
   acidifying the washings solution and supernatant to yield the chelating agent and an aqueous potassium sulfate.

* * * * *